United States Patent
Lang et al.

(10) Patent No.: US 7,445,344 B2
(45) Date of Patent: Nov. 4, 2008

(54) OPTIMISATION OF THE ILLUMINATION OF A PROJECTION APPLIANCE

(75) Inventors: Harald Lang, Karlsruhe (DE); Sören Dambach, Karlsruhe (DE)

(73) Assignee: Barco Control Rooms GmbH, Karlsruhe (DE)

( * ) Notice: Subject to any disclaimer, the term of this patent is extended or adjusted under 35 U.S.C. 154(b) by 373 days.

(21) Appl. No.: 10/536,984

(22) PCT Filed: Dec. 3, 2003

(86) PCT No.: PCT/EP03/13627

§ 371 (c)(1),
(2), (4) Date: Feb. 23, 2006

(87) PCT Pub. No.: WO2004/051993

PCT Pub. Date: Jun. 17, 2004

(65) Prior Publication Data

US 2006/0256295 A1 Nov. 16, 2006

(30) Foreign Application Priority Data

Dec. 4, 2002 (DE) ................. 102 56 506

(51) Int. Cl.
*G03B 21/28* (2006.01)
(52) U.S. Cl. ........................................ 353/98; 353/50
(58) Field of Classification Search ................. 353/46, 353/50, 51, 98; 359/197, 209, 210, 211, 359/212, 223, 225
See application file for complete search history.

(56) References Cited

U.S. PATENT DOCUMENTS

| 5,079,544 | A | | 1/1992 | DeMond et al. | |
|---|---|---|---|---|---|
| 5,085,505 | A | * | 2/1992 | Tsuchida | ................. 353/98 |
| 5,625,738 | A | | 4/1997 | Magarill | |
| 5,884,991 | A | | 3/1999 | Levis et al. | |
| 5,897,192 | A | | 4/1999 | Seufert | |
| 6,097,449 | A | * | 8/2000 | Yamamoto et al. | ............. 349/5 |
| 6,422,704 | B1 | | 7/2002 | Gyoten et al. | |
| 6,543,900 | B2 | * | 4/2003 | Noji et al. | ................. 353/94 |

FOREIGN PATENT DOCUMENTS

| DE | 3316032 | 11/1984 |
|---|---|---|
| DE | 8617601.3 | 10/1986 |
| DE | 4006189 | 9/1991 |
| DE | 19819245 | 6/1999 |
| DE | 19824917 | 12/1999 |
| DE | 19851000 | 6/2000 |
| DE | 10041896 | 3/2002 |
| DE | 10103099 | 8/2002 |
| DE | 10256506 | 7/2004 |

\* cited by examiner

*Primary Examiner*—William C. Dowling
(74) *Attorney, Agent, or Firm*—Venable LLP; Catherine M. Voorhees (57) ABSTRACT

In order to align the optical components of a projection apparatus (1), more particularly a rear projection apparatus of a projection wall, wherein the projection apparatus (1) comprises a light mixing rod (8), it is proposed to arrange an alignment deflecting mirror (19) in the illumination path of the imaging device (11) between the lamp (3) and the light mixing rod (8), wherein said alignment deflecting mirror (19) can be adjusted by means of servo motors (23).

23 Claims, 7 Drawing Sheets

OPTIMISATION OF THE ILLUMINATION OF A PROJECTION APPLIANCE

The invention relates to optimizing the illumination of the imaging device of projection apparatuses. Projection apparatuses serve to project an image onto a projection screen. The invention relates to projection apparatuses which comprise an imaging device for representing the image at a reduced scale, an illumination unit including a condenser system and/or a (preferably focusing) lamp reflector (e.g. in an elliptical or even complexer form) for illuminating the imaging device, and a projection assembly that comprises a projection lens and is provided for presenting the image represented by the imaging device enlarged onto the projection screen. Such projection apparatuses also comprise a spatial light mixing system for imaging local differences in brightness distribution. In order to adjust the position of the image projected on the projection screen, the imaging device and/or the projection assembly is usually attached in or to the projection apparatus in a position that can be adjusted by means of alignment elements.

There are front and rear projection apparatuses. Front projectors and rear projection systems differ in that rear projection systems mostly contain further optical elements, such as deflecting mirrors and projection screens, which are not used in front projectors.

Both front and rear projection apparatuses serve to show an image on a large-size projection screen. Herein, the imaging device may be a transmitted-light imaging device, that is an imaging device which is transilluminated transmissively by an illumination unit for illuminating the imaging device, or a reflecting imaging device which is illuminated by the illumination unit. According to the prior art, use is, for example, made of transmitted-light liquid-crystal imaging devices or reflective polysilicon or liquid-crystal imaging devices or DMDs (trademark of Texas Instruments Inc., Digital Micromirror Device).

Usually, an illumination unit for illuminating the imaging device or for transilluminating the transmitted-light imaging device comprises a light source, a reflector and a condenser system with one or more condenser lenses for illuminating the imaging device. Furthermore, additional light mixing systems and further imaging optical elements can be provided, for example for optimum illumination of a rectangular image format. It is also possible to do without the condenser system if a focusing, e.g. elliptical lamp reflector is used. The projection assembly or illumination unit is either integrated in or attached to the projection apparatus. Thus, a projection apparatus is a closed and complete unit for representing an image, wherein a screen for viewing the image is integrated in a rear projection apparatus.

Rear projection modules are, in particular, widely used whenever a complex image, for example consisting of various video or computer images, is to be shown on a large area. Prevalent fields of application for such rear projection apparatuses are projection walls which are viewed by a plurality of persons at the same time. Large-screen rear projection is widely used particularly in modern control station technology.

If the image to be shown is to exceed a specific size and complexity with given quality requirements, then this cannot be achieved with one single rear projection module any longer. In such cases, the image is composed of partial images each of which is shown by one rear projection module. In this case, each image shown by one rear projection module is a partial image of the overall image forming the projection wall and shown by all rear projection modules in their entirety.

According to the prior art, it is possible to mount side by side and/or stack one upon the other a great number of rear projection modules in a modular arrangement of an image projection wall, in order to represent a large-size image composed of many single partial images. The number of rear projection modules composed to form an image projection wall can be up to 150 or more.

Further details on rear projection modules are disclosed in document EP 0 756 720 B1 reference to which is made herewith.

In many cases, high requirements are established for projection devices, more particularly for projection walls that are made up of a modular design with a plurality of projection devices. Therein, the following problems must be surmounted.

It is particularly difficult to achieve and maintain a specific and uniform brightness of the image or images.

The lamps used in the various projection apparatuses, which are high-power lamps in many cases, differ in their basic brightness and in the position of their arc. Moreover, both variables change during the lifetime of the lamps in an ageing process that varies with each individual lamp. This requires repeated work-intensive calibration of the individual projection devices in order to achieve a homogeneous illumination of the image projected and, thus, a uniform representation on a projection wall, with the maximum light yield possible.

Particularly where projection apparatuses projecting a partial image of an overall image are concerned, the position of the image generated by the imaging device and projected by means of the projection lens must be very precisely adjusted on the stationary projection screen, in order to ensure that the overall image extending across a plurality of partial images appears as undistorted and seamless and with as few bars as possible. To achieve this according to the prior art, the projection apparatus is set up with a highly stable and inherently rigid frame in which or to which an image-forming module that is likewise mechanically rigid is inserted or attached respectively, said image-forming module comprising the illumination unit and the projection assembly. Herein, alignment elements used to adjust the position of the image-forming module in relation to the frame are provided in order to adjust the position of the image projected.

To ensure the necessary high precision, the prior art uses comprehensive and massive mechanical components so that stable components are created that can be adjusted precisely. For example, multi-axis alignment devices or alignment tables, e.g. optical cross tables, or complex setting devices, e.g. according to document DE 198 24 917 A1, are proposed.

The alignment devices presently used in practice are, furthermore, to disadvantage in that they render the adjustment of the position of the image projected extremely difficult and wearisome because, when an alignment element is readjusted, changes in the position of the image may occur which can also be achieved with other alignment elements. In other words, there is no absence of feedback among the individual alignment elements of an alignment device; on the contrary, the readjustment of an alignment element requires that individual or a plurality of other alignment elements be readjusted as well. In practice, this means that the alignment elements must be repeatedly readjusted in a lengthy iteration process which might take hours, in order to achieve the image position desired. This is highly work-intensive not only on the initial alignment of the projection apparatus, but also if a transport or maintenance or repair measures become necessary.

The smaller the imaging device becomes, the smaller the projection apparatus could be on principle, owing to the scaling rules of optical setups. A reduction in the size of the projection apparatus would, finally, allow to simplify the mechanical alignment components and the alignment work required. As the present development trend shows, imaging devices become smaller and smaller, and it must be expected that this development will continue. This trend is opposed by the fact that the high-power lamps used in projection assemblies which are, for the most part, gas discharge lamps cannot follow this trend; particularly because of their high operating temperature, it is not possible to further reduce their size to a further essential extent without failing to reach their target lifetime.

Even if the miniaturization of imaging devices and of the projection assembly containing an imaging device makes further progress, the size of the associated illumination unit will, therefore, hardly decline, so that the high mechanical efforts required for the alignment of the projection apparatus will remain as they are.

According to the prior art, these high technical requirements are solved by means of work-intensive methods which do not, however, solve the problems mentioned completely:

- For achieving an optimum illumination of the imaging device, the lamps are selected to a high degree in order to overcome minimum manufacturing tolerances that cannot be fallen below further. This is work-intensive and very expensive.
- While a projection apparatus or a projection wall is installed and/or when service work is carried out at regular intervals, the brightness and the homogeneity are calibrated. In this process, the brightness distribution is measured on the screen. This is work-and cost-intensive and requires skilled personnel as well as an interruption in current operation. The image quality may become worse intermediate the service work intervals.
- Taking into consideration the mean change of the light output during the operating time, which is based on empirical values. However, the deviation of single lamps from a mean time-dependent change in light output is so strong that it will result in visible image artifacts unless it is corrected for the individual lamps.
- Determination of the light output by measuring the lamp power by means of an electric measurement of both lamp current and lamp voltage. But the percentage of lamp drivers available permitting such an electric measurement is only small. Over and above this, the light power emitted by the projector is correlated with the total light power of the lamp in a first approximation only, due to the change in the size and position of the discharge arc. The consumption of the lamp electrodes characterizing the arc differs from lamp to lamp to such an extent that it is hardly reasonable to assume a mean consumption.
- Manual user input of a time-dependent change in light output and homogeneity, which must be taken into consideration. However, this requires that the user be trained appropriately and that special image contents be applied, thus disturbing continuous operation.
- Electronic compensation by modification of the image content. However, this is accompanied by a detrimental reduction in contrast; moreover, brightness differences cannot be compensated in case of dark image contents.
- The maintenance of projection apparatuses often requires that they be removed from their place of installation or parts of the illumination unit be removed from the projection apparatus. As has already been illustrated above, this results in a work-intensive re-alignment on startup.
- Where projection walls are concerned, the brightness calibration is based on the projection apparatus having the lowest luminosity. Since, owing to the lamp tolerances with regard to total light output and gas discharge arc lamp, there are strong variations in the brightness of the individual projection apparatuses, the differences in brightness between the lightest and the darkest elements of a projection wall are very great. Hence, the calibration inevitably results in a low total light yield.

Document DE 198 19 245 C1 discloses a video projector wherein two deflecting mirrors are arranged between the light source and the imaging device and a rod-type light mixing system is arranged between the two deflecting mirrors. The deflecting mirror on the light incoming side of the light mixing rod is stationary. In order to adjust the coupling-out of the light going out of the light mixing rod, the deflecting mirror arranged on the light outgoing side of the light mixing rod can be adjusted by means of alignment elements. The alignment elements comprise screws which are loosened for alignment. The alignment is achieved by turning the deflecting mirror and by moving the deflecting mirror to or away from the imaging device. This alignment is exclusively intended for geometrically aligning the image of the light outgoing surface of the light mixing rod on the imaging device. An adjustment or optimization of the light emitted by the light source onto the light incoming surface of the light mixing rod, particularly by adjusting the angles of the light path, is not possible with the known apparatus.

With this prior art taken into consideration, the invention aims at allowing a satisfactory illumination of the imaging device in case of the aforementioned projection apparatuses. This problem is solved by the invention by means of a projection apparatus comprising the features of the appended independent apparatus claim and by means of a method comprising the features of the appended independent method claim. Preferred embodiments and further developments of the invention result from the dependent claims and the description following below including the related drawings.

Hence, a projection apparatus according to the invention, provided for projecting an image onto a projection screen, comprises an imaging device for representing the image at a reduced scale, an illumination unit with a lamp and a condenser system and/or a lamp reflector, preferably a focusing lamp reflector, for illuminating the imaging device, a projection assembly comprising a projection lens for presenting the image represented by the imaging device enlarged on the projection screen, and a spatial light mixing system for compensating local differences in brightness distribution, and, according to the invention, the projection apparatus is characterized in that it comprises an adjustable alignment deflecting mirror that is arranged in the illumination path of the imaging device and is provided for adjusting the illumination of the imaging device, wherein the position of said alignment deflecting mirror that is defined by tilt angles can be adjusted by changing the tilt angles, more particularly the polar and azimuthal angles of the beam reflected, by means of setting elements, wherein the alignment reflecting mirror is arranged in the light path between the lamp and the light mixing system.

A method according to the invention, provided for adjusting the illumination of an imaging device of a projection apparatus and, thus, for controlling the brightness of the projected image of a projection apparatus for projecting the image onto a projection screen, comprising an imaging device for representing the image at a reduced scale, an illumination unit with a lamp and a condenser system and/or a lamp reflector, preferably a focusing lamp reflector, for illuminating the imaging device, a projection assembly comprising a projection lens for presenting the image represented by the imaging device enlarged on the projection screen, and a spatial light mixing system for compensating local differences in brightness distribution, is characterized in that an adjustable alignment deflecting mirror is arranged in the illumination path of the imaging device for adjusting the illumination of the imaging device, wherein the position of said alignment deflecting mirror that is defined by tilt angles can be adjusted by changing the tilt angles, more particularly the polar and azimuthal angles of the beam reflected, by means of setting elements, wherein the alignment reflecting mirror is arranged in the light path between the lamp and the light mixing system.

As has been found within the scope of the invention, such a mirror can be used to optimize the illumination of the imaging device in a particularly advantageous manner. The invention facilitates easy adjustment and alignment of the luminous flux extending from the illumination unit to the imaging device and forms the basis of any improvements that can be attained there beyond.

According to a particularly advantageous additional feature, it is proposed that the alignment deflecting mirror is arranged intermediate the condenser system of the illumination unit or a (preferably focusing) lamp reflector and the imaging device. Therein, it can be preferably and additionally provided that further elements of the condenser system are arranged intermediate the alignment deflecting mirror and the imaging device, in order to illuminate the imaging device.

The invention concentrates on projection apparatuses comprising a spatial light mixing system for the compensation of local differences in brightness distribution. Such light mixing systems for attaining a homogeneous and homogenized illumination are known according to the state of the art. Herein, preferred use is made of a spatial light mixing system which extends in the direction of light propagation, in particular of a light mixing rod. Light mixing rods are known according to the state of the art. In this context, reference is made to document U.S. Pat. No. 5,625,738 wherein use can be made of hollow light mixing rods, i.e. based on surface reflection, as well as of solid light mixing rods, i.e. based on total reflection. For example, known embodiments comprise hollow mixing rods (refer e.g. to U.S. Pat. No. 5,625,738) and solid mixing rods (refer e.g. to DE 10103099 A1).

With a given angle distribution of the illumination, the homogenization effect of a light mixing rod, that is also referred to as degree of integration, depends on the ratio of length to cross-section. The greater this ratio, the higher the degree of integration. With the f-number for illumination ranging from 1 to 1.5, the ratio for a typical light mixing rod is about 5 to 10 with a length of 50 mm. A mixing rod with a high degree of integration is about twice as long, i.e. its ratio ranges from 10 to 20. Since the mean number of reflections in the internal region of the light mixing rod increases with an increased ratio, the reflection losses in case of hollow light mixing rods with a metallic reflective layer are higher and, thus, the light yield is lower. For that reason and because of the space practically available for installation of the light mixing rod, the degree of integration that can be attained in practice is limited.

In a projection apparatus according to the invention, which comprises a light mixing system, the alignment deflecting mirror that is adjustable according to the invention is arranged in the light path between the lamp and the light mixing system. By means of the alignment deflecting mirror, it is then possible to adjust the amount of light emitted by the lamp, said amount being coupled-in onto the light incoming surface.

In a preferred further development, the projection apparatus may comprise an illumination sensor for determining the illumination level provided by the illumination unit to the imaging device. Preferably, this illumination sensor is arranged such that, therewith, the luminous intensity of the illumination can be determined irrespective of the image content. The measurement values of such an illumination sensor permit the adjustment and calibration of the image projected or the projection apparatus in a simple manner.

In a further preferred embodiment, the illumination unit may be arranged in an illumination module and the projection assembly may be arranged in a separate projection module. In this context, a module is to be understood as an exchangeable complex part of the projection apparatus, which forms a closed functional unit. It comprises a standalone mechanical basic construction, for example a sectional frame and, if necessary, a housing and can be separately assembled and aligned.

Herein, the embodiment according to the invention of a projection apparatus with an alignment deflecting mirror creates the condition required for designing the modules in an arrangement that is particularly advantageous in practice, wherein above all the mechanical optical alignment of the projection module and the service work on the illumination module are simplified while a high light yield is maintained at the same time.

The invention is to particular practical advantage in that the brightness can be calibrated easily and quickly and in an uncomplicated manner and, if necessary, even during running operation. A further embodiment of the invention is to further advantage in that it is not necessary to use additional measuring instruments or employ skilled personnel, because calibration can be achieved automatically. For that reason, it is neither necessary to disturb or interrupt running operation to an essential degree; and even if use is made of illumination units with a dual-lamp module intended to ensure uninterruptible operation in the event of a failure of one of the lamps by switching over to the second lamp, calibration can be carried out immediately.

Thus, the invention allows to achieve goals already aimed at by those skilled in the art for a long time. In order to achieve particularly good results, preferred use is made of the measures described below, either separately or combined.

Using the arrangement according to the invention of an alignment deflecting mirror is to particular advantage in projection apparatuses where the imaging device can be controlled pixel by pixel and the projection apparatus contains a time-variable color filter—referred to as dynamic color filter below—for generating primary colors, in order to implement time-sequential additive color mixing. Herein, the preferred imaging device is a Digital Micromirror Device (DMD). A preferred embodiment of a dynamic color filter is a revolving color wheel.

Many commercially available projection apparatuses, for example video projection systems, use separate channels for each of the three primary colors. Such a system requires for each primary color an imaging device and optical paths which must converge onto the screen with pixel accuracy. Novel projection apparatuses use only one imaging device based on time-sequential additive color mixing, wherein the entire image is split into three single-colored partial images with regard to the primary colors red, green and blue. The imaging device is illuminated sequentially with the three primary colors. Therein, the image data to be represented is transferred to the imaging device according to the color that is just reaching the imaging device. The eye puts the colored partial images together to form a single full-color image. Likewise, the eye puts successive video images and partial video images together to form a full-motion image.

Such a system requires an apparatus for sequentially illuminating the imaging device with primary colors. The simplest apparatus of a dynamic color filter suitable for this purpose is a revolving color wheel serving to filter the color currently desired out of the white spectrum of an illumination unit.

Such color wheels for changing the color of the light coupled out by the projection lamp are, in general, produced from dichroic filters. Owing to their manufacture, however, the filters comprise deviations in their spectral filter characteristic manifesting themselves in differing filter edge positions. As a result, there are differences in the perception of the primary and mixed colors.

The imaging devices presently used in connection with time-sequential image generation are so-called Digital Micromirror Devices which are, for example, described in the patent publication U.S. Pat. No. 5,079,544. They comprise an arrangement of small moving mirrors for deflecting a light beam, either towards the projector lens (on) or away from the projector lens (off). By rapidly turning the pixels represented by the mirrors on and off, a gray scale can be achieved. The use of DMDs for the digitization of light is also known as DLP (digital light processing). A DLP projection system comprises a light source, optical elements, color filters, a digital control and formatting unit, a DMD, and a projector lens.

The imaging device preferably used in time-sequential additive color mixing is a Digital Micromirror Device (DMD). It is, however, also possible to use other imaging devices within the scope of the invention, for example the aforementioned imaging devices.

Preferably, the dynamic color filter for time-sequential generation of primary colors is a color wheel. Other appropriate apparatuses available at the moment or in the future may, however, also be used within the scope of the invention.

It is particularly known from such projection apparatuses with time-sequential color mixing that spatial light mixing systems in the form of a light mixing rod are used. The invention allows to improve coupling-in of light in the light mixing rod, while facilitating alignment.

The invention can, however, be used not only for DLP imaging devices (single-chip), i.e. in connection with a color wheel. Three-chip solutions (based on LCD or DMD) are also conceivable. In this case, a color wheel would not be used. Instead, colors would be split behind the light mixing rod.

The invention will be illustrated in more detail below by means of exemplary embodiments shown in the figures. The special features described therein can be used separately or combined, in order to create preferred embodiments of FIG. 1 is a schematic representation of components of a projection apparatus according to the prior art.

Figure 1:
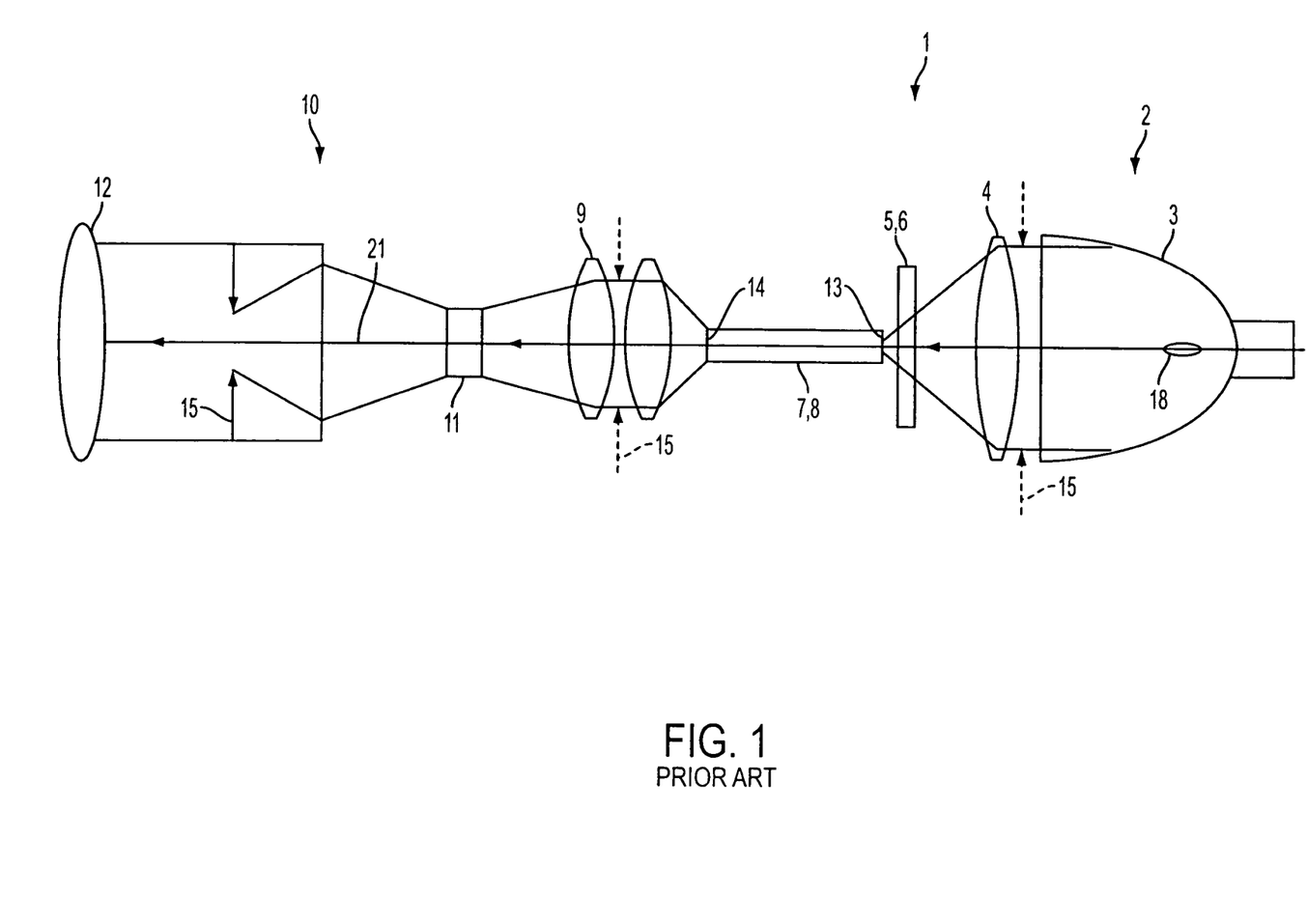

FIG. 1 shows the optical components of a projection apparatus 1 according to the prior art. It comprises an illumination unit 2 with a lamp 3 provided as light source, preferably a gas discharge lamp, and a condenser system 4. The components which follow in the light path are a dynamic color filter 5 in the form of a color wheel 6 and a spatial light mixing system 7 in the form of a light mixing rod 8 extending in the direction of light propagation. The light incoming surface 13 of the light mixing rod 8 is arranged in or in the immediate vicinity of the focal plane of the condenser system 4 or in the focal plane of a focusing lamp reflector. The light exiting from the light outgoing surface 14 of the light mixing rod 8 is imaged onto an imaging device 11 by means of an imaging optics 9, which is also referred to as relay optics.

A projection lens 12 of a projection assembly 10 forms an enlarged image of the image generated by the imaging device 11 on a projection screen (not represented), i.e. the image transmissively or reflectively generated by the imaging device 11 is projected onto a projection screen (not represented). In a preferred case of application of the invention, the projection apparatus 1 is a rear projection apparatus and the image projected by the projection lens 12 is a partial image of a projection wall containing a plurality of projection apparatuses or rear projection apparatuses.

The image projected is made up of successive monochrome partial images of the primary colors red, green and blue, utilizing the method of time-sequential mixing. The sequence may also contain a forth black-and-white partial image which is admixed to increase the brightness of the image. The sequence of partial images is effected at an adequately high speed, with the result that the eye cannot follow the color change and the colors are mixed physiologically.

The color wheel 6 serves to generate the primary colors red, green and blue from the white light of the lamp 3, in order to illuminate the imaging device 11. Preferably, the imaging device 11 is a DMD. If synchronized appropriately, the imaging device 11 can generate the monochrome partial images which are put together by the eye of the person viewing the image projected.

The light of the lamp 3 is focused to the input of the light mixing rod 8 by means of the condenser system 4. The revolving color wheel 6 comprises differently colored segments in the primary colors; depending on the revolving position of the color wheel 6, said segments transmit the spectral portions of the lamp 3 according to the color filter just present in the light path. The light mixing rod 8 ensures a homogeneous illumination, and the imaging optics 9 images the light distribution at the output of the light mixing rod 8 onto the imaging device 11. The color wheel 6 is arranged in the vicinity of the input or the output of the light mixing rod 8.

The basic brightness of the image projected, i.e. the brightness of an image with fully white image contents, depends on the luminance at the location of the imaging device 11. Due to the aforementioned problems, it is therefore desired to optimize the luminance at the location of the imaging device 11. In practical operation, diaphragms 15 or other methods can then be used to adjust the brightness.

Figure 2:
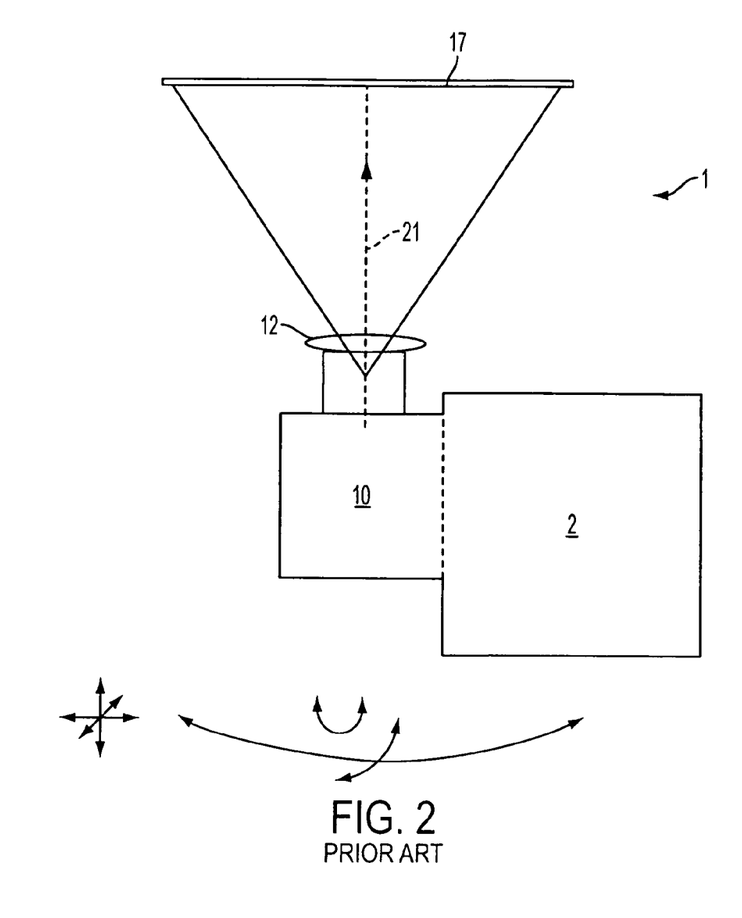
FIG. 2 shows the alignment of the projection apparatus of FIG. 1.

As has been illustrated above, the adjustment and alignment of the optical components in FIG. 1 must be highly accurate in order to achieve a high light yield and precise imaging. This is illustrated in FIG. 2 by means of a projection apparatus 1 according to the prior art, which must be aligned to a stationary projection screen 17 in six degrees of freedom. Said projection apparatus 1 comprises an illumination unit 2 and a projection assembly 10. The illumination unit 2 contains one or more lamps, the lamp drivers, and one or more power supply units. It occupies the major part of the projector mass and the volume. Apart from the imaging device 11 and the projection lens 12, the projection assembly 10 contains only a few optical elements and occupies only a minor part of the projector mass and the volume.

In the future, the miniaturization of the imaging devices 11 will cause the mass and/or volume ratio to become even more extreme. Since, owing to thermal boundary conditions, the lamps 3 that have been developed for continuous operation and designed for a long service life can be reduced in size only difficultly, an essential miniaturization of the illumination unit 2 cannot be expected. The trend of using dual-lamp solutions to increase the operational reliability even requires that illumination units be enlarged.

According to the prior art, the illumination unit 2 and the projection assembly 10 are arranged in a common housing. For adjustment, the entire unit is aligned by means of alignment elements in six degrees of freedom. This is very work-intensive and must be repeated in case a service measure becomes necessary.

Figure 3:
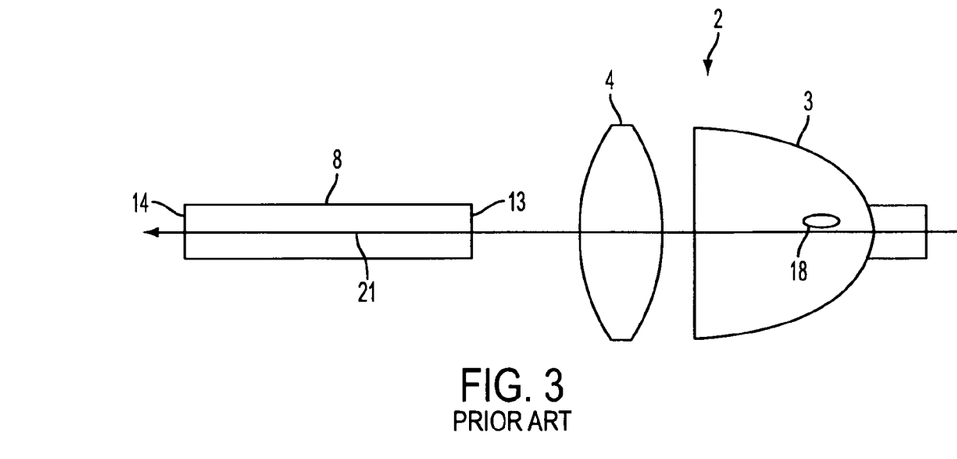
FIG. 3 shows the condenser system and the light mixing rod of FIG. 1.
Figure 4:
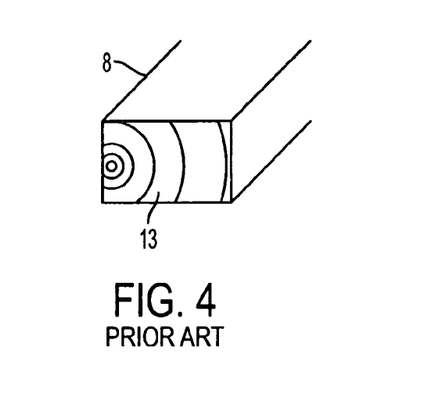
FIG. 4 shows the light incoming surface of the light mixing rod of FIG. 3.
Figure 5:
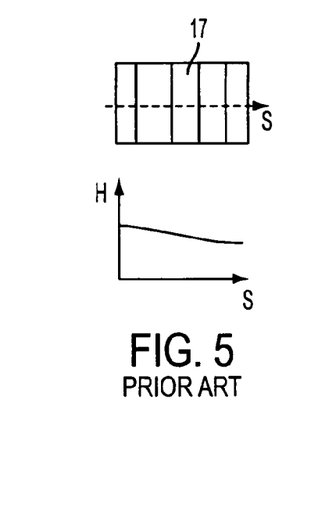
FIG. 5 shows the brightness distribution at the output of the light mixing rod of FIG. 3.

A further problem that is solved only inappropriately according to the prior art is illustrated by means of FIGS. 3 through 5. FIG. 3 shows an illumination unit 2 with a lamp 3 and a condenser system 4 as well as a light mixing rod 8. Precise focusing onto the light incoming surface 14 is necessary to achieve a high light yield.

The gas discharge lamps 3 used, however, exhibit variations in the position of the discharge arc 18 that must, typically, be ascribed to manufacturing, operating and ageing processes. For better illustration, FIG. 3 shows the position of a misaligned discharge arc 18.

Unless the wrong position of the discharge arc 18 is corrected, the illumination at the light incoming surface 13 of the light mixing rod 8 shifts as is illustrated in FIG. 4. As a result, the incoupling efficiency is thus, on the one hand, reduced, i.e. the total brightness of the projection apparatus 1 will be reduced. On the other hand, the asymmetric illumination of the light incoming surface 13 leads to an inhomogeneous light distribution at the light outgoing surface 14. This must be attributed to the fact that the light is always mixed to a limited extent only, owing to the finite length of the light mixing rod 8. With a given length of the light mixing rod 8, the highest homogeneity at the light outgoing surface 14 can, for symmetry reasons, only be achieved if the illumination of the light incoming surface is symmetrical. With an asymmetric illumination of the light incoming surface 13 taken into consideration, the light mixing rod required to achieve an adequate degree of homogeneity at the light outgoing surface 14 would have to be longer than with a symmetric illumination and would, thus, not be usable in practice. Hence, the brightness H on the projection screen 17 may comprise spatial variations, such as brightness courses.

The above drawbacks with regard to the adjustment and correction of the brightness of projection apparatuses according to the prior are obviated by the arrangement according to the invention of an alignment deflecting mirror or this is allowed by such an alignment deflecting mirror in a further embodiment. The operating method of the invention is illustrated in more detail in FIGS. 6 through 10.

Figures 6, 7, 8, 9, 10:
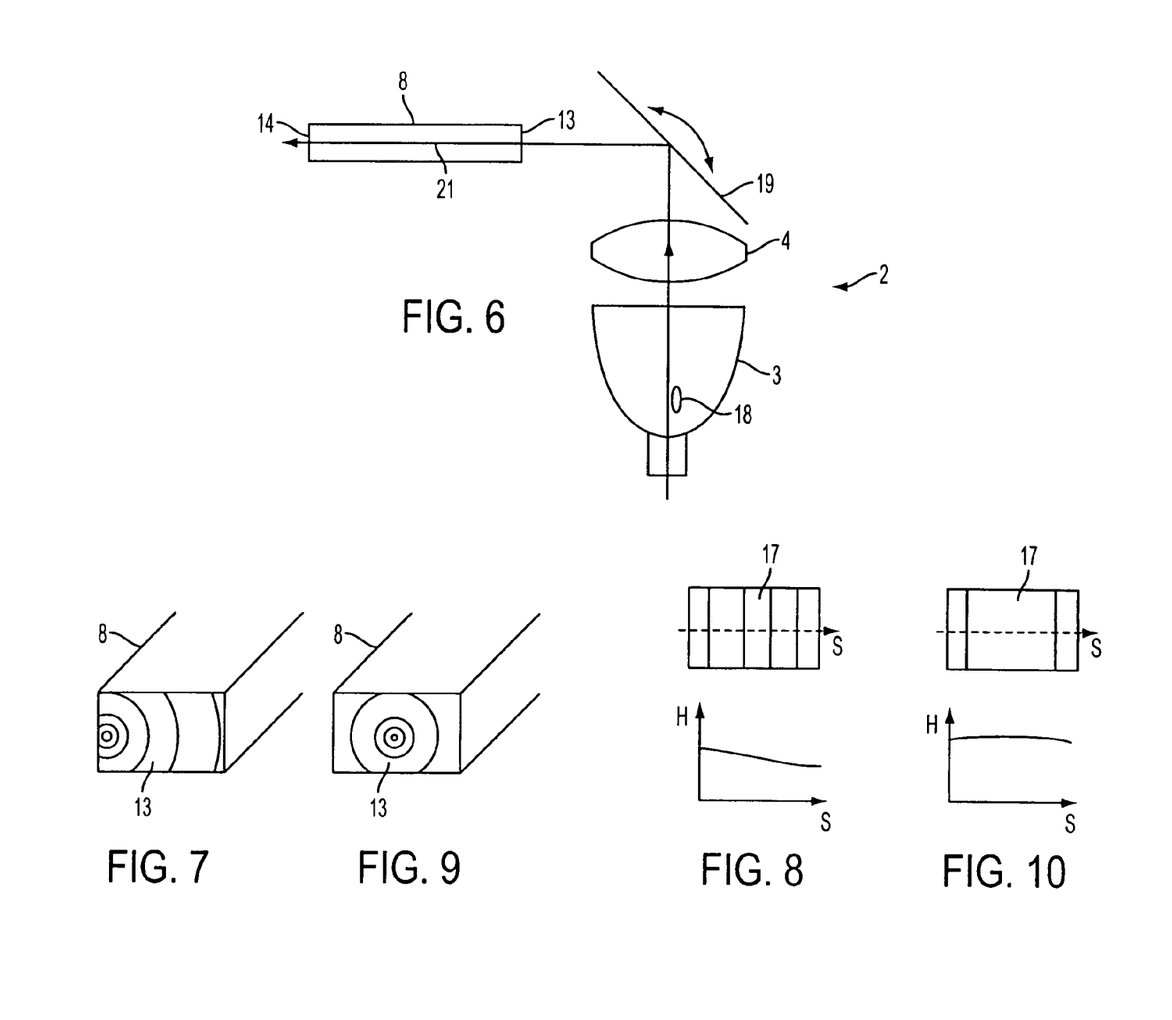
FIG. 6 shows an alignment deflecting mirror according to the invention, including a light mixing rod.
FIG. 7 shows the light incoming surface of the light mixing rod of FIG. 6 without correction.
FIG. 8 shows the brightness distribution at the output of the light mixing rod according to FIG. 7.
FIG. 9 shows the light incoming surface of the light mixing rod of FIG. 6 with correction.
FIG. 10 shows the brightness distribution at the output of the light mixing rod according to FIG. 9.

FIG. 6 shows an illumination unit 2 with a lamp 3 and a condenser system 4. Furthermore, it shows an adjustable alignment deflecting mirror 19 according to the invention. The use of an alignment deflecting mirror 19 allows to solve two tolerance problems at the same time:

A lateral deviation of the discharge arc 18 from the optical axis 21 results in an asymmetric illumination at the light incoming surface 13 of the light mixing rod 8 (FIG. 7). As a result, an inhomogeneous light distribution at the light outgoing surface 14 (FIG. 8) as well as a reduced total efficiency must be expected.

By adjusting the two-dimensional setting angle of the alignment deflecting mirror 19, it is possible to center the illumination of the light incoming surface 13 of the light mixing rod 8 (FIG. 9). This results in an increased coupling efficiency and also in a considerably more homogeneous light distribution at the light outgoing surface 14 (FIG. 10) of the light mixing rod 8.

The same problems will arise if the light mixing rod 8 is offset or tilted in relation to the optical axis 21. In this case, it is also possible to center the illumination of the light incoming surface 13 by adjusting the alignment deflecting mirror 19 and, thus, to improve the efficiency and homogeneity of the light transmission. This forms the basis for mechanically separating the illumination unit 2 and the projection assembly 10 from each other in a further embodiment of the invention.

Figure 11:
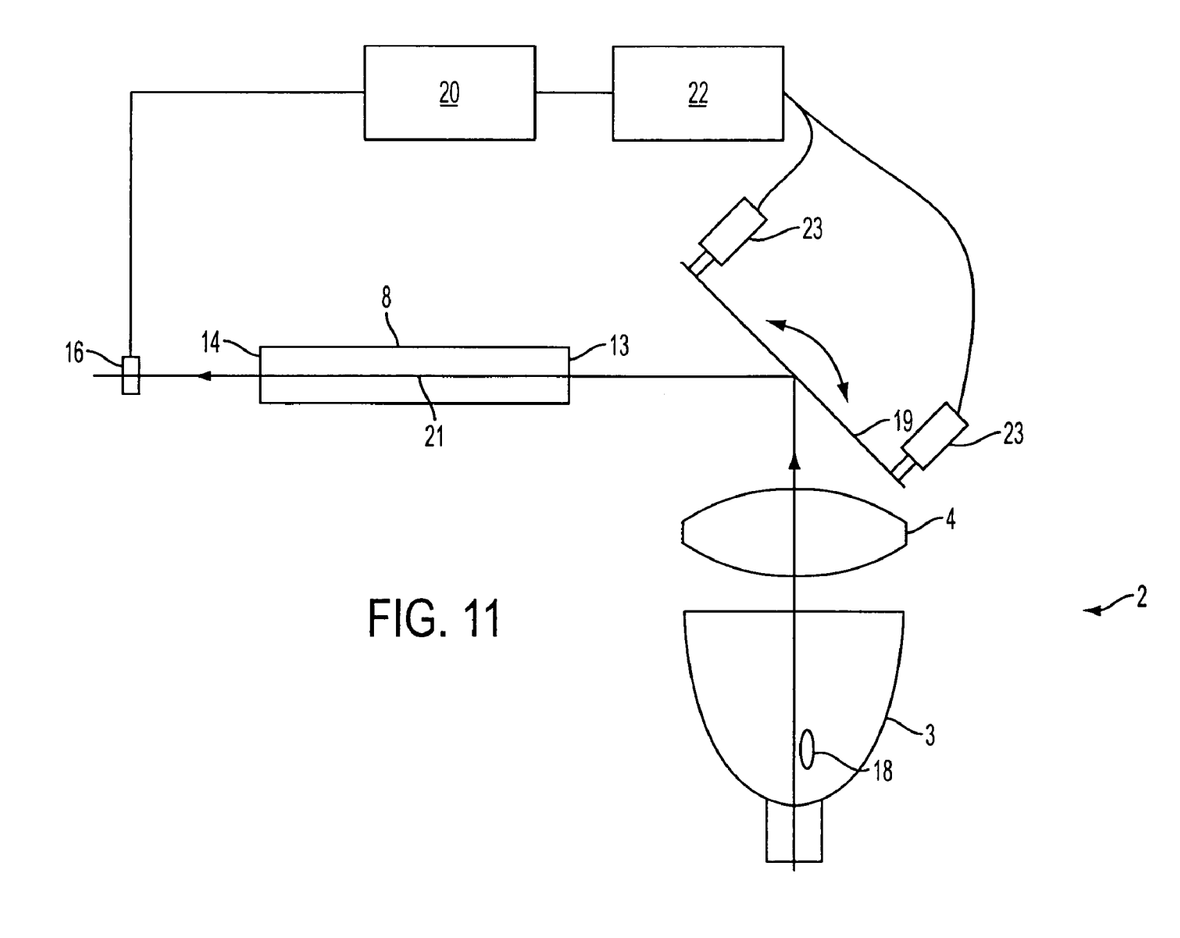
FIG. 11 shows an alignment deflecting mirror according to the invention, including an illumination sensor, setting elements and a control unit.

FIG. 11 illustrates a preferred embodiment of a projection apparatus 1 with an illumination sensor 16 for determining the intensity of the illumination of the imaging device 11 provided by the illumination unit 2, preferably irrespective of the image content. The illumination sensor 16 is positioned behind the light mixing rod 8 and detects the quantity of light exiting from the light outgoing surface 14 of the light mixing rod 8. Hence, the sensor signal provides information on the efficiency with which the light of the lamp 3 is coupled into the light mixing rod 8. A control loop for adjusting the two-dimensional angle of the alignment deflecting mirror 19 can be realized by evaluating the sensor signal by means of a data evaluation unit 20. Therein, a motor control 22 and drivable setting elements, e.g. two servo motors 23 or two other actuators tilt the alignment deflecting mirror 19 in relation to its setting angle and in relation to the signal of the illumination sensor 16.

The alignment deflecting mirror can be aligned by the control unit in an automated manner, in order to achieve an optimum brightness of the image projected. Therein, the angle settings of the alignment deflecting mirror 19 can, for example, be scanned automatically, in order to determine the optimum value or approach this value iteratively.

In order to enhance the sensitivity for finding the optimum setting, one or more diaphragms that can be inserted in the path of light, preferably two slotted diaphragms arranged in transverse direction to each other, can be provided according to a further advantageous feature. Therein, the diaphragms can be arranged in the light path before or behind the alignment deflecting mirror 19.

Figure 12:
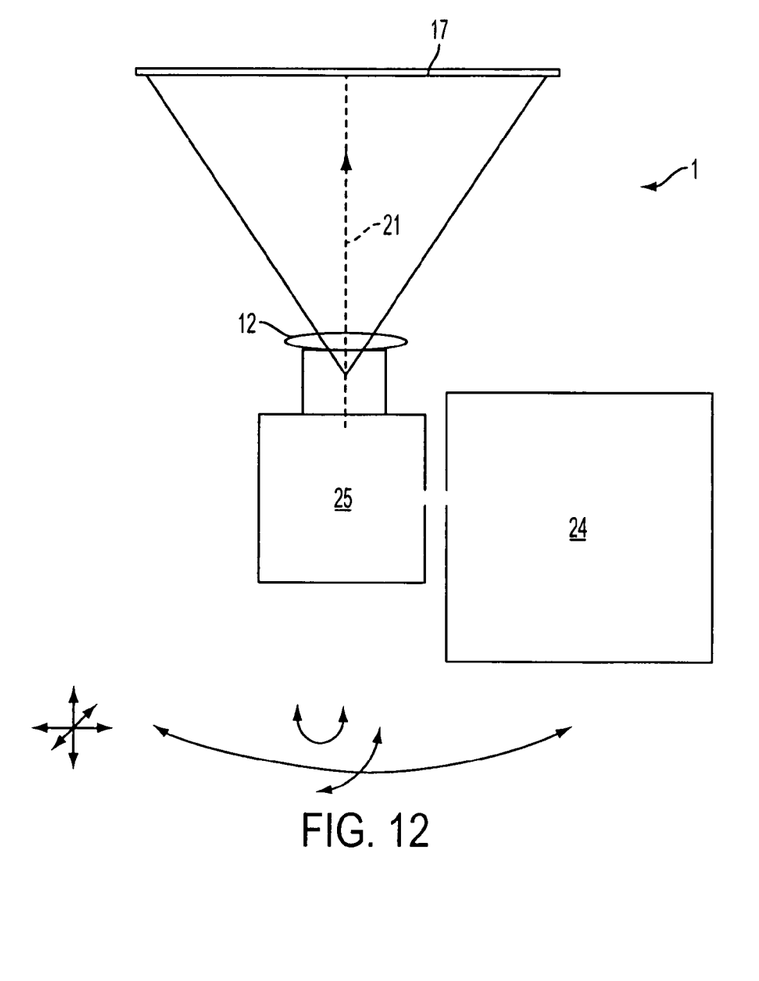
FIG. 12 shows a projection apparatus according to the invention, including an illumination module and a projection module.

FIG. 12 illustrates a particularly advantageous further development of a projection apparatus 1, wherein the illumination unit 2 is arranged in an illumination module 24 and the projection assembly is arranged in a separate projection module 25. Therein, the imaging device 11 and the projection lens 12 are, preferably, arranged in the projection module 25, whereas the alignment deflecting mirror 19 and the condenser system 4 of the illumination unit 2 are arranged in the illumination module 24. If provided, further condenser lenses are, preferably, arranged in the projection module 25.

In particular, it can be provided that the illumination module 24 contains two or more lamps for maintaining current operation in the event of a defective lamp, that the illumination module 24 contains an electronic lamp driver required for supplying the lamp 3 with voltage and a power supply unit, that the illumination module 24 has a volume in excess of that of the projection module 25, or that the illumination module 24 has a mass in excess of that of the projection module 25.

As has been illustrated above, such a projection apparatus 1 comprising separate modules 24, 25 can be aligned in a particularly easy manner. To achieve this, it is preferably provided that said projection apparatus 1 comprises alignment means for fine-aligning the image projected, wherein said alignment means can be used to adjust the position of the projection module 25 in the projection apparatus 1, and that the position of the illumination module 24 is fixed in the projection apparatus 1 or that the illumination module 24 comprises alignment means for coarse-aligning the position of the illumination module 25 in the projection apparatus 1.

The use of the adjustable alignment deflecting mirror 19 allows to mechanically separate the illumination unit 2 and the projection assembly 10 in separate modules 24, 25. While a projection apparatus is installed, for example in a module of a projection wall, the more massive illumination module 24 can remain at a fixed position, whereas the smaller projection module 25 is aligned opposite to the fixed projection screen 17 in the six degrees of freedom.

This provides the following advantages:
  Owing to the reduced mass that has to be aligned, the mechanical alignment components can be designed considerably less massive and less comprehensive, i.e. more cost-effective.
  The alignment is easier for the personnel charged with the installation.
  Most of the service-relevant assemblies can be accommodated in the fixed illumination module 24. Thus, a misalignment of the projection module 25 and the necessary re-alignment become considerably less probable in the event of service measures.
  Furthermore, the modular design of the illumination module 24 and the projection module 25 allow, for example, to exchange the illumination 24 completely while the projection assembly 10 remains aligned in the projection module 25, with the result that the illumination module 24, after having been subjected to a service measure, or an exchanged illumination module can be inserted in the projection apparatus 1 and the image projected can be calibrated without an alignment of the projection module 25 becoming necessary therein.

Figure 13:
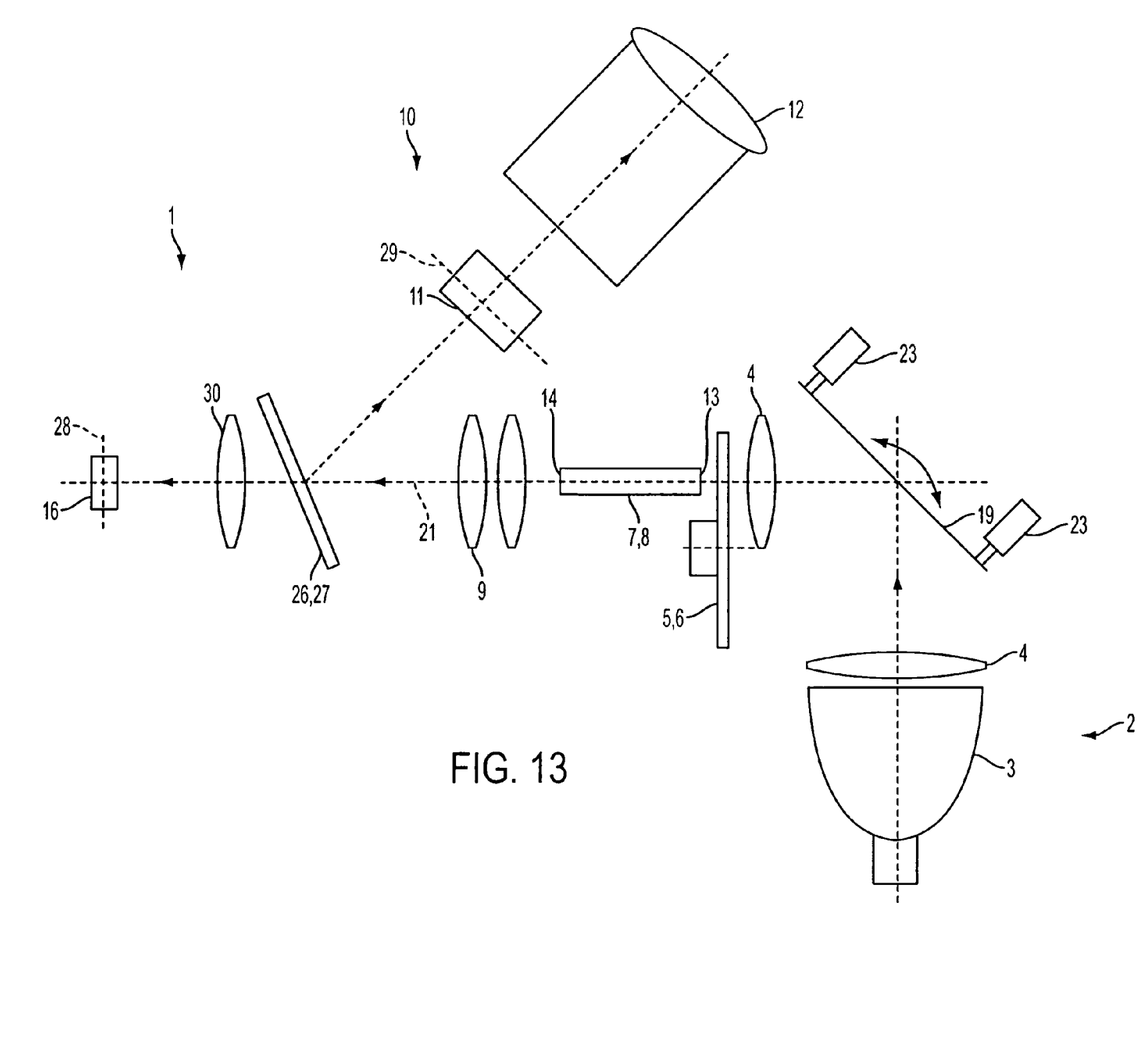
FIG. 13 shows a projection apparatus with an out-coupling element.

FIG. 13 illustrates a further advantageous embodiment of a projection apparatus 1, wherein a further illumination condenser for illuminating the imaging device 11 can be arranged between the alignment deflecting mirror 19 and the imaging device 11 and wherein said projection apparatus 1 comprises a spatial light mixing system 7 in the form of a light mixing rod 8 for compensating local differences in brightness distribution.

The alignment deflecting mirror 19 is arranged between the condenser 4 of the illumination unit 2 and the light incoming surface 13 of the spatial light mixing system 7. Furthermore, the projection apparatus 1 comprises an optical outcoupling element 26 for coupling out a part of the luminous flux generated by the illumination unit 2 for illuminating the imaging device 11, wherein said outcoupling element 26 is arranged in the illumination path between the illumination unit 2 and the imaging device 11 and couples the light out of the light path on its way from the illumination unit 2 to the imaging device 11. Preferably, the outcoupling element 26 is arranged between the light outgoing surface 14 of the light mixing rod 8 and the imaging device 11. A preferred embodiment of an outcoupling element 26 is a semi-transparent mirror 27.

The light for the illumination sensor 16 (cf. FIG. 11) is coupled out by means of the semi-transparent mirror 27. Therein, it can be preferably provided that the illumination sensor 16 is arranged in an optical plane 28 corresponding to the illumination plane 29 of the imaging device 11, that the corresponding planes 28, 28 contain an image of the output of the spatial light mixing system 7, and that the projection apparatus 1 comprises a sensor optics 30 which is used to generate a reduced image of the illumination pattern of the imaging device 11 on the illumination sensor 16.

The invention comprises the following and other advantages. By using the alignment deflecting mirror 19,
  the light yield can be maximized with the lamp tolerances presently given; the variations in light yield among the various projection apparatuses can be minimized, resulting in an effectively increased total light yield on a projection wall;
  the light beam can be centered in relation to the light mixing rod 8, resulting in an increased homogeneity of image illumination;
  the illumination homogeneities achieved are adequate even with shorter light mixing rods 8;
  a selection of the lamps 3 used can be done without;
  it is possible to mechanically decouple the projection assembly 10 and the illumination unit 2 in separate housings or modules 24, 25, wherein the more massive illumination module 24 with the illumination unit 2 remains unaligned, fixed and stationary and the alignment in relation to the stationary projection screen 17 is achieved exclusively by means of the smaller projection module 25. The mechanical alignment components can be designed considerably less massive and less expensive, while the same precision is maintained at the same time. Since the service-relevant components, such as the lamp, the lamp drivers and the power supply unit, are contained in the illumination module 24, a re-alignment of the projection apparatus is, usually, not necessary any longer after completed maintenance work.

LIST OF REFERENCE NUMBERS

1 Projection apparatus
2 Illumination unit
3 Lamp
4 Condenser system
5 Dynamic color filter
6 Color wheel
7 Spatial light mixing system
8 Light mixing rod
9 Imaging optics
10 Projection assembly
11 Imaging device
12 Projection lens
13 Light incoming surface related to 8
14 Light outgoing surface related to 8
15 Diaphragm 16 Illumination sensor
17 Projection screen
18 Discharge arc
19 Alignment deflecting mirror
20 Data evaluation unit
21 Optical axis
22 Motor control
23 Servo motor
24 Illumination module
25 Projection module
26 Outcoupling element
27 Semi-transparent mirror
28 Plane related to 16
29 Plane related to 11
30 Sensor optics
H Image brightness

The invention claimed is:

1. A projection apparatus for projecting an image onto a projection screen comprising
an imaging device for representing the image at a reduced scale, an illumination unit with a lamp and a condenser system and/or a lamp reflector, preferably a focusing lamp reflector, for illuminating the imaging device,
a projection assembly comprising a projection lens and provided for imaging the image represented by the imaging device enlarged on the projection screen, and
a spatial light mixing system for compensating local differences in the brightness distribution, characterized in that it comprises an adjustable alignment deflecting mirror that is arranged in the illumination path of the imaging device and is provided for adjusting the illumination of the imaging device, wherein the position of said alignment deflecting mirror that is defined by tilt angles can be adjusted by means of setting elements which change particularly the polar and azimuthal angles of the beam reflected, wherein the alignment reflecting mirror is arranged in the light path between the lamp and the light mixing system.

2. A projection apparatus according to claim 1, characterized in that the alignment deflecting mirror is arranged between the condenser system of the illumination unit or a lamp reflector and the imaging device.

3. A projection apparatus according to claim 1, characterized in that further condenser lenses for illuminating the imaging device are arranged between the alignment deflecting mirror and the imaging device.

4. A projection apparatus according to claim 1, characterized in that the light incoming surface of the spatial light mixing system is arranged in or in the immediate vicinity of the focal plane of the condenser of the illumination unit or a lamp reflector.

5. A projection apparatus according to claim 1, characterized in that the spatial light mixing system is a device, more particularly a light mixing rod, extending in the direction of light propagation.

6. A projection apparatus according to claim 1, characterized in that the alignment deflecting mirror is arranged between the condenser of the illumination unit or a lamp reflector and the light incoming surface of the spatial light mixing system.

7. A projection apparatus according to claim 1, characterized in that it comprises an illumination sensor for determining the intensity of the illumination of the imaging device provided by the illumination unit.

8. A projection apparatus according claim 1, characterized in that it comprises an optical outcoupling element for coupling out a part of the luminous flux generated by the illumination unit for illuminating the imaging device, wherein said outcoupling element is arranged in the illumination path between the illumination unit and the imaging device and couples the light out of the light path on its way from the illumination unit to the imaging device.

9. A projection apparatus according to claim 8, characterized in that the outcoupling element is arranged between the output of the spatial light mixing system and the imaging device.

10. A projection apparatus according to claim 8, characterized in that the outcoupling element is a semi-transparent mirror.

11. A projection apparatus according to claim 7, characterized in that it comprises drivable setting elements for adjusting the position of the alignment deflecting mirror and a control unit, which can be used to align the position of the alignment deflecting mirror in relation to the signal of the illumination sensor.

12. A projection apparatus according to claim 11, characterized in that the alignment deflecting mirror is automatically aligned by the control unit.

13. A projection apparatus according to claim 1, characterized in that it comprises one or more diaphragms that can be inserted in the path of light, preferably two slotted diaphragms arranged in transverse direction to each other, for adjusting the alignment deflecting mirror.

14. A projection apparatus according claim 1, characterized in that the illumination unit is arranged in an illumination module and the projection assembly is arranged in a separate projection module.

15. A projection apparatus according to claim 14 characterized in that the imaging device and the projection lens are arranged in the projection module.

16. A projection apparatus according to claim 14, characterized in that the alignment deflecting mirror and the condenser system of the illumination unit or the lamp reflector are arranged in the illumination module.

17. A projection apparatus according to claim 14, characterized in that it comprises alignment means for fine-aligning the image projected, wherein said alignment means can be used to adjust the position of the projection module in the projection apparatus.

18. A projection apparatus according to claim 14, characterized in that the position of the illumination module is fixed in the projection apparatus or that the illumination module comprises alignment means for coarse-aligning the position of the illumination module in the projection apparatus.

19. A projection apparatus according to claim 14, characterized in that the illumination module, after having been subjected to a service measure, or an exchanged illumination module can be inserted in the projection apparatus without an alignment of the projection module becoming necessary therein.

20. A projection apparatus according to claim 1, characterized in that it is designed as a rear projection apparatus.

21. A projection wall, comprising a plurality of projection apparatuses according to claim 1.

22. A method for adjusting the illumination of an imaging device of a projection apparatus for projecting an image onto a projection screen, comprising
an imaging device for representing the image at a reduced scale,
an illumination unit with a lamp and a condenser and/or a lamp reflector, preferably a focusing lamp reflector, for illuminating the imaging device, and a projection assembly comprising a projection lens and provided for imaging the image represented by the imaging device enlarged on the projection screen, and a spatial light mixing system for compensating local differences in brightness distribution, characterized in that an adjustable alignment deflecting mirror for adjusting the illumination of the imaging device is arranged in the illumination path of the imaging device, wherein the position of said alignment deflecting mirror that is defined by tilt angles can be adjusted by means of setting elements which change particularly the polar and azimuthal angles of the beam reflected, wherein the alignment reflecting mirror is arranged in the light path between the lamp and the light mixing system.

23. A method according to claim 22, characterized in that it comprises a feature of a projection apparatus.

* * * * *